(12) United States Patent
Harrison et al.

(10) Patent No.: US 10,922,225 B2
(45) Date of Patent: Feb. 16, 2021

(54) FAST CACHE REHEAT

(71) Applicant: Drobo, Inc., San Jose, CA (US)

(72) Inventors: Rodney George Harrison, London (GB); Jason Paul O'Broin, San Jose, CA (US)

(73) Assignee: Drobo, Inc., Sunnyvale, CA (US)

( * ) Notice: Subject to any disclaimer, the term of this patent is extended or adjusted under 35 U.S.C. 154(b) by 288 days.

(21) Appl. No.: 13/790,163

(22) Filed: Mar. 8, 2013

(65) Prior Publication Data

US 2013/0198456 A1  Aug. 1, 2013

Related U.S. Application Data

(63) Continuation-in-part of application No. 13/363,740, filed on Feb. 1, 2012.

(60) Provisional application No. 61/547,953, filed on Oct. 17, 2011, provisional application No. 61/440,081, (Continued)

(51) Int. Cl.
*G06F 12/0802* (2016.01)
*G06F 11/14* (2006.01)
*G06F 12/0893* (2016.01)

(52) U.S. Cl.
CPC ...... *G06F 12/0802* (2013.01); *G06F 11/1441* (2013.01); *G06F 12/0893* (2013.01); *G06F 2201/84* (2013.01)

(58) Field of Classification Search
CPC ............ G06F 12/0802; G06F 11/1441; G06F 11/1446; G06F 11/1448; G06F 11/1456; G06F 11/1461; G06F 11/1471; G06F 12/0893; G06F 2201/87
See application file for complete search history.

(56) References Cited

U.S. PATENT DOCUMENTS

| 5,287,500 A | 2/1994 | Stoppani, Jr. ................. 395/600 |
| 5,644,701 A * | 7/1997 | Takewaki ............ G06F 11/1407 711/144 |
| 5,664,187 A | 9/1997 | Burkes et al. ................ 395/621 |

(Continued)

FOREIGN PATENT DOCUMENTS

| WO | WO 2007/021997 A2 | 2/2007 | ............. G06F 17/30 |
| WO | WO 2011/082138 A1 | 7/2011 | ............... G06F 7/00 |

OTHER PUBLICATIONS

Chen et al. The Rio File Cache: Surviving Operating System Crashes,1996, ACM Digital Library,74-76.*

(Continued)

*Primary Examiner* — Reginald G Bragdon
*Assistant Examiner* — Aaron D Ho
(74) *Attorney, Agent, or Firm* — Sunstein LLP

(57) ABSTRACT

Embodiments of the present invention allow for fast cache reheat by periodically storing a snapshot of information identifying the contents of the cache at the time of the snapshot, and then using the information from the last snapshot to restore the contents of the cache following an event that causes loss or corruption of cache contents such as a loss of power or system reset. Since there can be a time gap between the taking of a snapshot and such an event, the actual contents of the cache, and hence the corresponding data stored in a data store, may have changed since the last snapshot was taken. Thus, the information stored at the last snapshot is used to retrieve current data from the data store for use in restoring the contents of the cache.

20 Claims, 5 Drawing Sheets

Related U.S. Application Data filed on Feb. 7, 2011, provisional application No. 61/438,556, filed on Feb. 1, 2011.

(56) References Cited

U.S. PATENT DOCUMENTS

| | | | |
|---|---|---|---|
| 5,890,214 A | 3/1999 | Espy et al. | 711/114 |
| 6,032,224 A | 2/2000 | Blumenau | 711/117 |
| 6,327,638 B1 | 12/2001 | Kirby | 711/4 |
| 6,622,263 B1* | 9/2003 | Stiffler | G06F 11/1469 711/135 |
| 7,096,336 B2 | 8/2006 | Furuhashi et al. | 711/165 |
| 7,191,285 B2 | 3/2007 | Scales et al. | 711/114 |
| 7,613,945 B2 | 11/2009 | Soran et al. | 714/5 |
| 7,814,272 B2 | 10/2010 | Barrall et al. | 711/114 |
| 7,814,273 B2 | 10/2010 | Barrall | 711/114 |
| 7,818,531 B2 | 10/2010 | Barrall | 711/170 |
| 7,873,782 B2 | 1/2011 | Terry et al. | 711/114 |
| 7,934,069 B2 | 4/2011 | Cochran et al. | 711/167 |
| 7,949,637 B1 | 5/2011 | Burke | 707/655 |
| 8,046,537 B2 | 10/2011 | Carr et al. | 711/117 |
| 8,452,929 B2* | 5/2013 | Bennett | G06F 11/1441 711/156 |
| 9,678,884 B1 | 6/2017 | Derbeko et al. | |
| 2005/0063397 A1* | 3/2005 | Wu et al. | 370/401 |
| 2005/0117418 A1* | 6/2005 | Jewell | G06F 11/1441 365/202 |
| 2006/0010169 A1 | 1/2006 | Kitamura | 707/200 |
| 2006/0107006 A1 | 5/2006 | Green et al. | 711/162 |
| 2006/0150010 A1* | 7/2006 | Stiffler | G06F 11/1438 714/13 |
| 2006/0174157 A1 | 8/2006 | Barrall et al. | 714/6 |
| 2006/0206675 A1 | 9/2006 | Sato et al. | 711/161 |
| 2007/0091497 A1 | 4/2007 | Mizuno et al. | 360/51 |
| 2007/0260846 A1 | 11/2007 | Burton | 711/216 |
| 2008/0091877 A1 | 4/2008 | Klemm et al. | 711/114 |
| 2008/0168228 A1 | 7/2008 | Carr et al. | 711/117 |
| 2009/0089504 A1 | 4/2009 | Soran et al. | 711/114 |
| 2009/0327603 A1 | 12/2009 | McKean et al. | 711/114 |
| 2010/0042783 A1* | 2/2010 | Schwarz | G06F 11/1441 711/118 |
| 2010/0082547 A1 | 4/2010 | Mace et al. | 707/648 |
| 2010/0095164 A1 | 4/2010 | Kamei et al. | 714/48 |
| 2010/0100677 A1 | 4/2010 | McKean et al. | 711/114 |
| 2010/0121828 A1 | 5/2010 | Wang | 707/694 |
| 2010/0199036 A1 | 8/2010 | Siewert et al. | 711/112 |
| 2011/0010488 A1 | 1/2011 | Aszmann et al. | 711/103 |
| 2012/0198152 A1 | 8/2012 | Terry et al. | 711/114 |

OTHER PUBLICATIONS

Dell Inc., "Optimize Data Placement—Automated Tiering," www.dellstorage.com_compellent_software_automated-tierin_1.pdf, 1 page, 2013.

Dell Inc., "The Architectural Advantages of Dell Compellent Automated Tiered Storage," www.dellstorage.com_WorkArea_DownloadAsset.aspx_id=1491.pdf, 1 page, 2013.

$EMC^2$, "Leveraging EMC Clariion CX4 Fully Automated Storage Tiering (FAST) for Enterprise Application Deployments, Applied Technology," White Paper, 25 pages, Feb. 2010.

$EMC^2$, "EMC FAST VP for Unified Storage Systems, A Detailed Review," White Paper, 19 pages, Mar. 2011.

$EMC^2$, "EMC VNX Virtual Provisioning, Applied Technology," White Paper, 33 pages, Mar. 2011.

$EMC^2$, "EMC Tiered Storage for Microsoft SQL Server 2008 Enabled by EMC Symmetrix VMAX with FAST, A Detailed Review," EMC Global Solutions, 31 pages , May 2010.

Harker et al., "Dynamic Storage Tiering: the Integration of Block, file and Content," Hitachi Data Systems, 17 pages, Sep. 2010.

Hewlett-Packard Company et al., "Thin provisioning with native hierarchical storage management," Research Disclosure Journal, 4 pages, Jul. 2008.

Kovar, "Automated Tiered Storage Gaining Traction Through Cost Savings, Performance," CRN http://www.crn.com/news/storage/229700082/automated-tiered-storage-gaining-traction-through-cost-savings-performance.htm, 5 pages, May 27, 2011.

Pariseau, "Vendors take different approaches to automated tiered storage software for solid-state drives," http://searchsolidstatestorage.techtarget.com/news/1378753/Vendors-take-different-approaches-to-automated-tiered-storage-software-for-solid-state-drives, 14 pages, Jan. 13, 2010.

Robb, "Automated SSD Tiering: EMC's Fast Wasn't First," http://www.enterprisestorageforum.com/technology/features/article.php/3857481/Automated-SSD-Tiering-EMCs-FAST-Wasnt-First.htm, 4 pages, Jan. 8, 2010.

Second Chair Video, "HyBrid Disk Writes to SSD; Mirrors to HDD," http://www.secondchairvideo.com/?p=1702, 2 pages, Feb. 24, 2010.

Storage Review, "RAID 1 SSD + 7200 RPM HD," Storage Forums, http://forums.storageview.com/index.php/topic/26950, 3 pages, Jun. 24, 2008.

Sun Oracle, "Deploying Hybrid Storage Pools with Oracle Flash Technology and the Oracle Solaris ZFS File System," An Oracle White Paper, 20 pages, Aug. 2011.

The Taneja Group, Inc., "The State of the Core—Engineering the Enterprise Storage Infrastructure with the IBM DS8000," Taneja Group, Technology Analysts, Technology in Depth, 21 pages, Apr. 2010.

The Storage Anarchist, "1.059: fully automated storage tiering (fast)," The Storage Anarchist, a blog about advanced storage and technology, written from a unique perspective, hestorageanarchist.typepad.com_weblog_2009_04_1059, 6 pages, Apr. 14, 2009.

Yoshida, "HDS Blogs: Flash, SAS, SATA, and Hitachi Dynamic Tiering are Hot!," blogs.hds.com_hu_2010_10_flash-sas-sata-and-hitachi-dyna, 3 pages, Oct. 19, 2010.

International Searching Authority, Notification of Transmittal of the International Search Report and the Written Opinion of the International Searching Authority, or the Declaration, International Application No. PCT/US2012/023468, dated Jul. 30, 2012, 5 pages.

International Searching Authority, International Search Report—International Application No. PCT/US2014/021136, dated Sep. 17, 2015, together with the Written Opinion of the International Searching Authority, 4 pages.

* cited by examiner

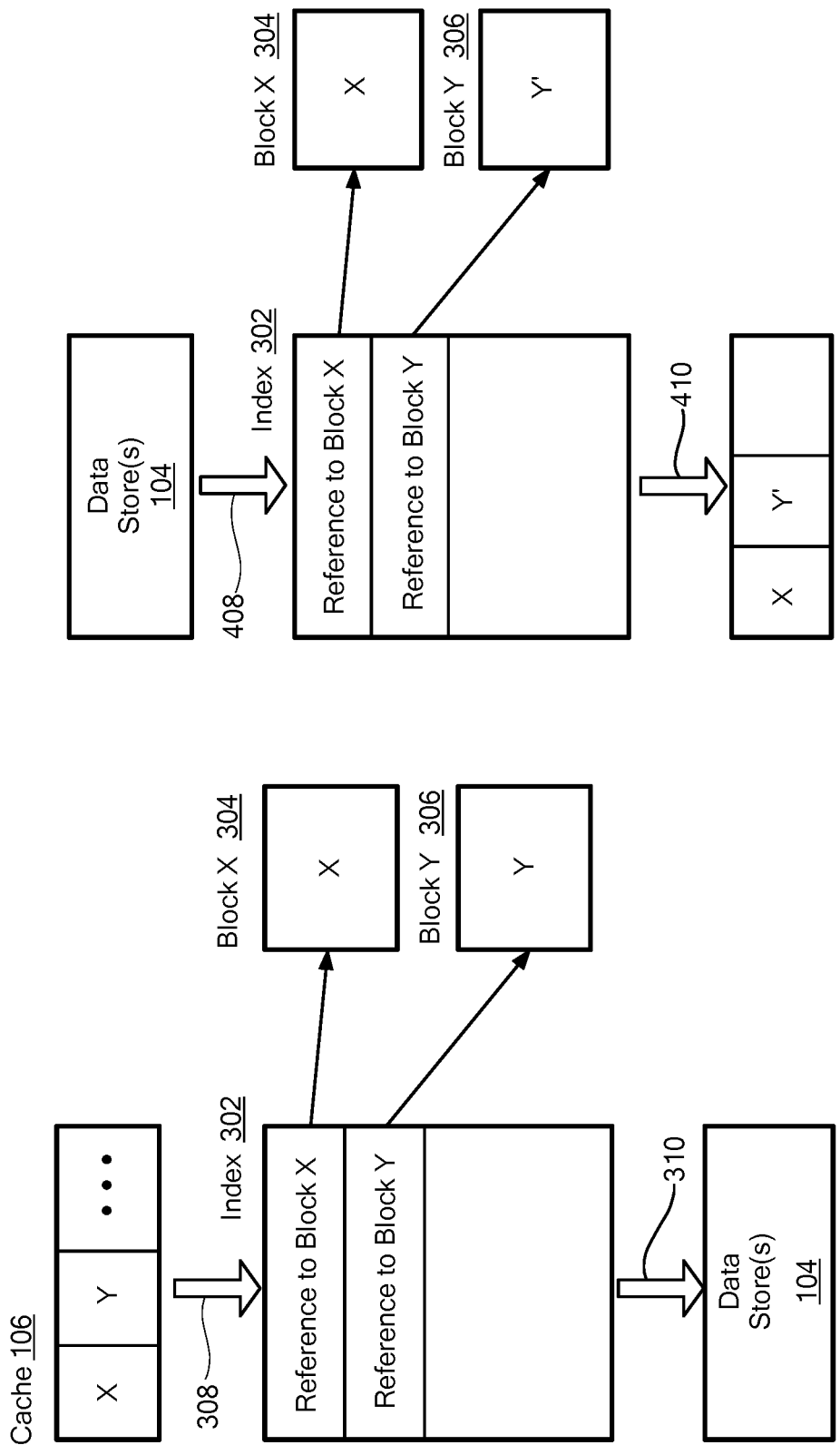

FAST CACHE REHEAT

CROSS-REFERENCE TO RELATED APPLICATION(S)

This application is a continuation-in-part of, and therefore claims priority from, U.S. patent application Ser. No. 13/363,740 entitled SYSTEM, APPARATUS, AND METHOD SUPPORTING ASYMMETRICAL BLOCK-LEVEL REDUNDANT STORAGE filed on Feb. 1, 2012, which claims the benefit of the following U.S. Provisional Patent Applications: U.S. Provisional Patent Application No. 61/547,953 filed on Oct. 17, 2011, which is a follow-on to U.S. Provisional Patent Application No. 61/440,081 filed on Feb. 7, 2011, which in turn is a follow-on to U.S. Provisional Patent Application No. 61/438,556, filed on Feb. 1, 2011. Each of these patent applications is hereby incorporated herein by reference in its entirety.

FIELD OF THE INVENTION

The present invention relates generally to data storage systems, and, more particularly, to initialization of a cache memory following a system reset or other event.

BACKGROUND OF THE INVENTION

A cache is commonly used in a computer system to provide fast access to part of a dataset. Typically, a cache memory is significantly faster than the main data store, often by more than an order of magnitude. Cache memories are usually quite small relative to a larger data store from which their contents are obtained. For example, a CPU may have a cache of 2 MiB used to accelerate access to 16 GiB of DRAM, or a 4Ti B hard disk may have of DRAM as its cache.

Because of the large disparity in the size of a typical cache and the dataset being accelerated, the choice of which data to cache, and when, is critical. Equally critical is the choice of which data to evict from a cache and when such an eviction should take place.

A computer system may have several levels of cache, perhaps of differing speed and size, and also may have several types of cache. Some caches may be generic and able to hold any data in the system, e.g. a processor L2 cache, and some caches may be specialized and able to only hold very specific types of data, e.g. a processors translation look-aside buffer used to hold only address translation tables. Some caches are built from special hardware, e.g. processor L2 and TLB caches, while other caches may be ordinary DRAM used to accelerate access to data normally held on a slower medium, e.g. a magnetic disk. Some caches may hold data that are expected to cycle through very quickly (e.g. a processor L2 cache, Host Logical Block information) and some hold data that may stay in cache for a long time (e.g., some page address translations in a TLB, Cluster Lookup Translations).

Some caches hold datasets that may take considerable time to build, e.g., translations from host address blocks in frequently accessed data to internal locations in a complex virtualized disk system. For example, address translations for a large database file, e.g. a mail server's index database, may take hours or even days to build into a hot set. However, once those translations are cached, some of them may remain stable for a considerable time, days or even weeks. Maintaining such long lived cached data can provide a significant performance win but also can be difficult as older cached data will naturally tend to age out and be replaced with more recently accessed, but transient, data. Splitting the cache into parts and driving each part with an algorithm tuned specifically for its duty, e.g. long lived versus highly transient data, can successfully alleviate this premature eviction issue.

Those data frequently accessed so as to be held in a cache are often referred to as a "hot set" or "hot data." As the set of hot data changes, the data in the cache will be accessed less frequently and the data in the main store will be accessed more frequently. This can be viewed as a cooling of the temperature of the data in the cache and is a sign that some data should be evicted from the cache in order to make way for new, hotter, data to be cached.

Under certain circumstances, such as a loss of power or a system reset, contents of a cache may be lost or corrupted. When this happens, any cached information that was long-lived in the previous boot of the system are lost and the cache must be repopulated. In many cases, the same data are once again brought into cache as the data are accessed, but the cache miss penalty must be paid on the first access to each piece of data, and performance suffers as a result. For datasets such as a mail server's index, this loss of performance can persist for many hours as heat is slowly built back into the cache.

Some systems attempt to avoid such loss or corruption of cache contents by using non-volatile cache memories (e.g., NVRAM, DRAM with battery backup, etc.). Other systems attempt to avoid such loss or corruption of cache contents by periodically storing a copy (snapshot) of the contents of the cache and, when needed, restoring the contents of the cache to the contents of the last snapshot. However, since there can be a time gap between storing a snapshot copy of the contents of the cache and an event that causes loss or corruption of cache contents such as a loss of power or system reset, the actual contents of the cache, and hence the corresponding data stored in a data store, may have changed since the last snapshot was taken. Restoring a stale snapshot into a cache would likely cause stale data to be loaded into the cache with disastrous consequences. For example, if an address translation had changed between the time of the last snapshot and the time of a system restart, the snapshot would contain stale data.

SUMMARY OF EXEMPLARY EMBODIMENTS

In one embodiment there is provided a method for fast cache reheat in a data storage system. The method involves periodically storing, in a first data store, a snapshot of an index identifying storage locations associated with contents of a cache, and, upon a restart of the data storage system, retrieving the index from the last snapshot stored prior to the restart, retrieving, from a second data store, data from storage locations identified in the index, and storing the retrieved data in the cache.

In various alternative embodiments, the first data store and the second data store may be the same data store or may be different data stores. The first data store and/or the second data store may include a set of block storage devices. The index may identify physical storage locations and/or virtual storage addresses. Retrieving data from storage locations identified in the index may involve translating a virtual storage address to a physical storage address for the second data store.

In certain embodiments, the cache may include an application program interface, in which case the cache may provide the index via the application program interface.

Retrieving data from storage locations identified in the index may involve providing the retrieved index to the cache via the application program interface and retrieving the data by the cache. The data storage system may include a cache miss handler, in which case retrieving the data by the cache may include making calls to the cache miss handler by the cache.

In another embodiment there is provided a data storage system including a storage processor configured to manage storage of data in at least one data store and a cache, wherein the storage processor is configured to periodically store an index identifying storage locations associated with contents of the cache in a first data store and, upon a restart of the data storage system, retrieve the index from the last snapshot stored prior to the restart. The storage processor and/or the cache is configured to retrieve data from storage locations identified in the index from a second data store and store the retrieved data in the cache.

In various alternative embodiments, the first data store and the second data store may be the same data store or may be different data stores. The first data store and/or the second data store may include a set of block storage devices. The index may identify physical storage locations and/or virtual storage addresses. Retrieving data from storage locations identified in the index may involve translating a virtual storage address to a physical storage address for the second data store.

In certain embodiments, the cache may include an application program interface, in which case the cache may provide the index via the application program interface and the storage processor may store the snapshot of the index in the second data store. Retrieving data from storage locations identified in the index may involve retrieving the index from the second data store by the storage processor, providing the retrieved index by the storage processor to the cache via the application program interface, and retrieving the data by the cache. The storage processor may include a cache miss handler, in which case retrieving the data by the cache may include making calls to the cache miss handler by the cache.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which:

FIG. 3 is a schematic diagram depicting production and storage of the cache index, in accordance with one exemplary embodiment;

FIG. 4 is a schematic diagram depicting retrieval of the index and reheating of the cache, in accordance with the exemplary embodiment of FIG. 3;

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
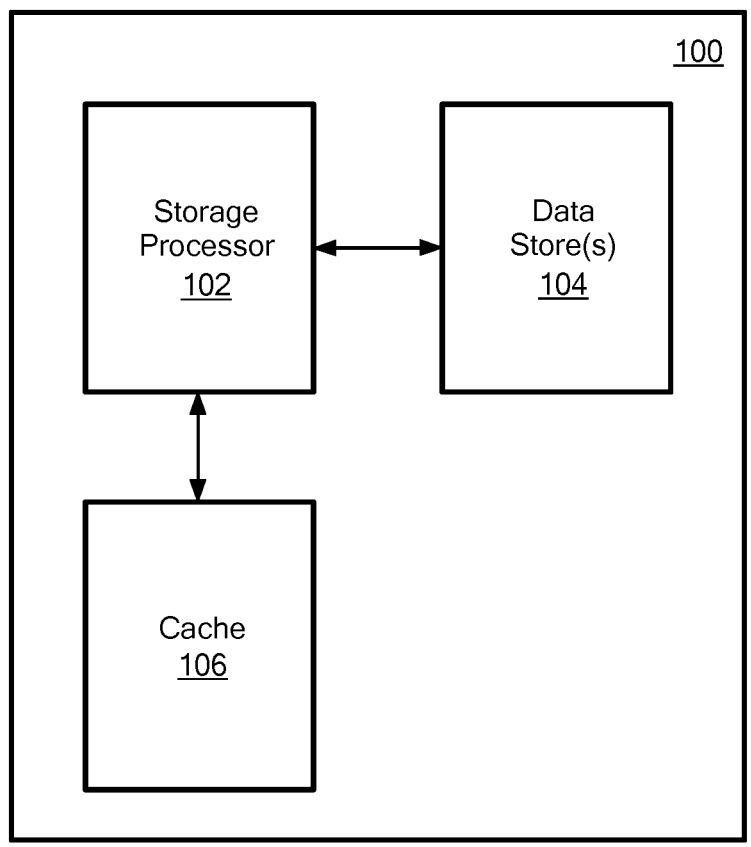
FIG. 1 is a schematic block diagram of a data storage system, in accordance with one exemplary embodiment of the present invention.

Definitions. As used in this description and the accompanying claims, the following terms shall have the meanings indicated, unless the context otherwise requires:

A "data store" is a non-volatile storage system that may contain one or more non-volatile storage devices, such as disk drives, SSD drives, NVRAM, etc.

The term "cache" refers generally to a memory that is used to temporarily store copies of certain data that is also stored in a data store, for example, to improve the speed of access to such data and/or reduce the number of accesses made to the data store relative to such data.

A "snapshot" is a process by which certain information is written to a data store on a periodic basis.

The term "periodic" with regard to a snapshot just means that a snapshot is taken from time to time (e.g., roughly every minute, every ten minutes, or every hour, etc.) and does not necessarily mean that the snapshot is taken at precise periodic intervals.

A "data storage system" can be any system that stores data in one or more data stores and also includes a cache. The data store(s) may be integral to the data storage system or external to the data storage system (e.g., accessed via a communication interface). Without limitation, a data storage system may be a file server, a NAS device, a disk array system, a disk drive, a computer, etc.

A "restart" of a data storage system may include any event for which fast cache reheat is performed in a particular embodiment. Without limitation, examples of such events include power-on or power cycle, soft reboot of the system, or reboot of a hardware or software component of the system that manages a cache.

A "block storage device" is a type of data store that includes a block storage interface. Without limitation, block level storage devices may include certain disk drives, SSD drives, storage appliances, storage arrays, etc.

A "set" includes one or more members.

Embodiments of the present invention allow for fast cache reheat by periodically storing a snapshot of information identifying the contents of the cache at the time of the snapshot (referred to hereinafter as an "index" of the contents of the cache), and then using the information from the last snapshot to restore the contents of the cache following an event that causes loss or corruption of cache contents such as a loss of power or system reset. Since there can be a time gap between the taking of a snapshot and such an event, the actual contents of the cache, and hence the corresponding data stored in a data store, may have changed since the last snapshot was taken. Thus, the index stored at the last snapshot is used to retrieve current data from the data store for use in restoring the contents of the cache, as opposed to periodically storing the actual contents of the cache and restoring those contents back to the cache. The ability to rapidly reheat the cache with valid contents allows the system to immediately come back online at full operational performance so as to avoid the penalties due to cache misses that would result from restarting with a cold cache.

Thus, in order to ensure proper cache coherency, the snapshots do not contain the actual cached data but instead contain the identity of the cached data. In other words, the cache's indexing information rather than the actual data in the cache are stored in the snapshot. When the cache is reheated, the data described by the snapshot is reloaded into the cache, thus ensuring only up-to-date data are loaded.

For example, if the cache contains the contents of certain disk blocks, then the snapshots would contain information identifying the disk blocks rather than the content of those disk blocks. When the cache is reheated, the current contents of the disk blocks are retrieved and loaded into cache and so the cache will contain the current contents of the blocks even if the contents had changed since the last snapshot was taken.

FIG. 1 is a schematic block diagram of a data storage system 100, in accordance with one exemplary embodiment of the present invention. Among other things, the data storage system 100 includes a storage processor 102, one or more data stores 104, and a cache 106. Based on any of a variety of caching schemes (some of which may be driven by the storage processor 102, some of which may be driven by hardware external to the storage processor 102), certain data from the data store(s) is stored in the cache 106 based on accesses to that data. For example, as blocks of data are read from the data store(s), those blocks may be stored in the cache 106 so that future accesses to those blocks can be satisfied from the cache 106 rather than from the data store(s) 104, increasing the speed of those accesses while reducing the load on the data store(s) 104. The storage processor 102 includes various hardware and/or software components configured to manage storage of data in the data store(s) 104, such as, for example, managing the physical and logical storage constructs of a file system managed in the data store(s) 104 such as clusters, blocks, and zones.

Figure 2:
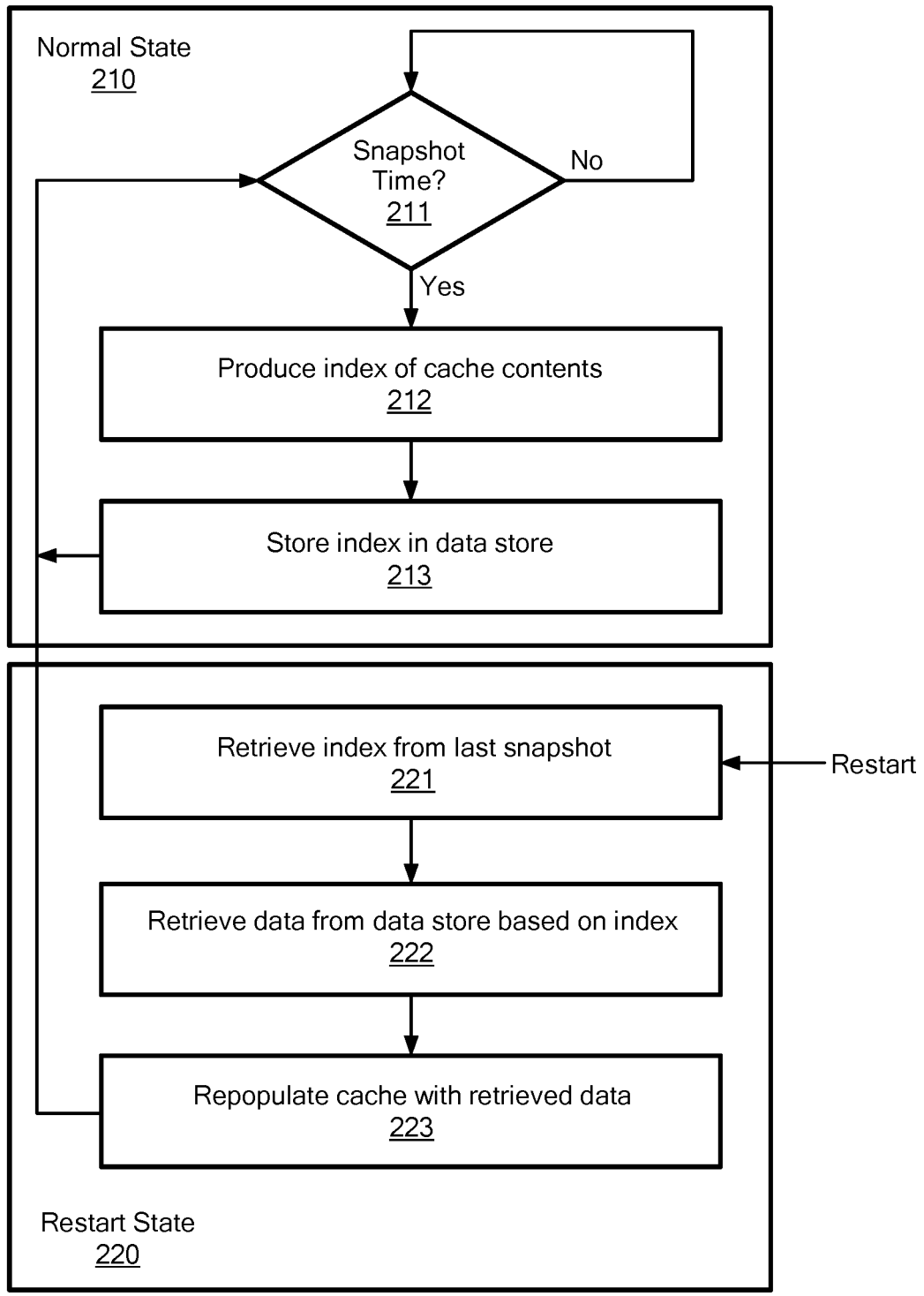
FIG. 2 is a logic flow diagram for a fast cache reheat process, in accordance with one exemplary embodiment.

FIG. 2 is a logic flow diagram for a fast cache reheat process, in accordance with one exemplary embodiment. During a normal operational state 210, the storage processor 102 runs a timer 211 to determine when to take snapshots of the cache index. When the storage processor 102 determines that it is time to take a snapshot of the cache index (YES in block 211), the storage processor 102 produces an index of the cache contents, in block 212, and stores the index in the Data Store(s) 104, in block 213. The logic returns from block 213 to block 211 to await the next snapshot interval. When a restart occurs, the system enters a restart state 220 in which the cache is reheated, specifically by retrieving the index from the last snapshot, in block 221, and retrieving data from the Data Store(s) 104 based on the index and re-populating the cache with the retrieved data, in block 222. The logic moves from block 222 to the normal state 210, and more specifically to block 211 to await the next snapshot interval. It should be noted that the snapshots may be stored in the same data store as the data represented in the cache or may be stored in a different data store than the data represented in the cache. Thus, for example, the snapshots may be stored in a NVRAM or portion of battery-backup RAM, while the data may be stored in a disk drive or disk array.

FIG. 3 is a schematic diagram depicting production and storage of the cache index, in accordance with one exemplary embodiment. In this example, the cache 106 contains the contents of two blocks, specifically data X from Block X 304 and data Y from Block Y 306. When a snapshot is taken, an index 302 that identifies the contents of the cache is produced as represented by the arrow 308, and the index 302 is stored in the data store(s) 104, as represented by the arrow 310.

FIG. 4 is a schematic diagram depicting retrieval of the index and reheating of the cache, in accordance with the exemplary embodiment of FIG. 3. Here, the index 302 is retrieved from the data store(s) 104, as indicated by the arrow 408. The index 302 is used to retrieve the contents of Block X 304 and Block Y 306 from the data store(s) 104 and store the retrieved data in the cache 106, as indicated by the arrow 410. In this example, however, between the time the index 302 was produced and stored and the time the index was retrieved, the data in Block Y 306 was changed from a state Y to a state Y'. Thus, rather than repopulating the cache 106 with contents X and Y, the cache 106 is repopulated with contents X and Y'.

In certain exemplary embodiments, the data in the snapshots are described in the same address space as the indexes of the cache itself. For but one example, if address translations for certain host logical blocks (e.g., host logical blocks 100 to 200) are stored in a certain disk block (e.g., disk block 652), then information from which that disk block can be accessed (e.g., a physical or logical address, a block number, etc.) is stored in the snapshot rather than storing the actual address translations from the disk block. This further ensures that if the usage of a block previously used to describe host logical block address (LBA) translations is changed after a snapshot is taken, the cache will not load stale translations when reheated. In the example above, disk block 652 may be repurposed after the most recent snapshot was taken. In this case, the contents of disk block 652 would still be loaded into cache as part of the reheating process. However, since disk block 652 no longer describes the address translations for host LBAs 100 to 200, one of two things may happen. Either disk block 652 contains host LBA translations for a different range or it contains some other data not related to host LBA translations. In the former case, the data loaded during reheat is valid for the cache and may be accessed or aged out normally. In the latter case, the data loaded is not valid for the cache, i.e., it is not data of the same type as the rest of the data in the cache. This would seem to be a potential cause for corruption. However, since the cache is indexed in terms of the same address space stored in the snapshots, it can be demonstrated that whatever index table is mapping host LBA ranges to disk blocks must no longer contain an entry for the stale block In other words, the cache will never be asked to return data for disk block 652, at least not until that disk block has once again be repurposed and re-written with valid translation data.

The above example refers to the cache index, and therefore the contents of the reheat snapshot, as single, or ranges of, disk blocks, e.g., disk block 652. However, it should be noted that the present invention is not limited to any particular type of indexing scheme. Thus, for example, data to be restored to the cache may be indexed using physical addresses, virtual addresses, file names, file handles, data store object numbers, and/or other information that allows the data to be retrieved from the data store(s) 104.

For another example, data to be restored to the cache may be indexed using a virtual address space, such as addresses in the form of a zone and offset tuple (e.g., zone 96, offset 16384), in which case the snapshot saved to the data store would contain those same addresses. Upon retrieval of the cache index from the data store(s) 104, any virtualized addresses would be converted into physical addresses, e.g., disk number and block(s), in order to retrieve the corresponding data from the data store(s) 104 and repopulate the cache 106 with the retrieved data.

For yet another example, in certain exemplary embodiments as described in U.S. patent application Ser. No. 13/363,740, transactional data may be stored in a physical or logical transactional storage tier. Transactional performance is heavily gated by the hit rate on cluster access table (CAT) records, which are stored in non-volatile storage, and which translate between logical host addresses and the corresponding locations of clusters in storage zones. The system maintains a cache of CAT records in the Zone MetaData Tracker (ZMDT) cache. A cache miss forces an extra read from disk for the host I/O, thereby essentially nullifying any advantage from storing data in a higher-performance transactional zone. Thus, in order to deliver reasonable transactional performance, the system effectively must sustain a high hit rate from this cache.

After a system restart, the ZMDT memory will naturally be empty and so transactional I/O will pay the large penalty of cache misses caused by the additional I/O required to load the array's metadata. Using fast cache reheat as described herein, the addresses of the cluster lookup table (CLT) sectors in the ZMDT cache may be stored during a snapshot, allowing those CLT sectors to be pre-loaded after a restart so as to enable the system to boot with an instantly hot ZMDT cache. In this exemplary embodiment, the data that needs to be saved is already in the cache's index structure, implemented in an exemplary embodiment as a splay tree.

In certain exemplary embodiments, the storage processor 102 does not need to have knowledge of the internal structure or workings of the cache 106, but rather the cache 106 manages the index and reheating of the cache contents based on the index. Specifically, in order for the storage processor 102 to take a snapshot of the cache index, the cache 106 provides the index to the storage processor 102 via an application program interface (API), and the storage processor stores the index in the data store(s) 104. When a restart occurs, the storage processor 102 retrieves the index from the last snapshot and provides the index to the cache 106, which uses data in the snapshot to make calls to a cache miss handler of the storage processor 102 in order to effect the repopulation required for reheat, i.e., the cache 106 can simply look up the required data as if it were being asked to do so by one if its usual consumers.

Figure 5:
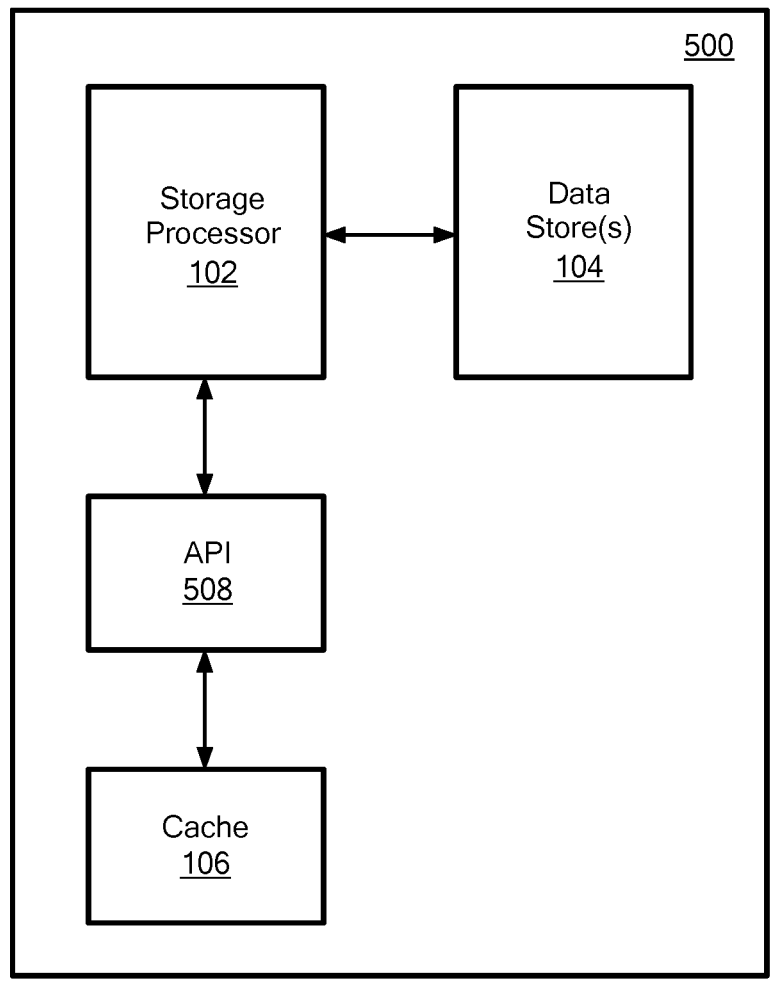
FIG. 5 is a schematic block diagram of a data storage system, in accordance with an exemplary embodiment of the present invention in which the cache provides an API for managing the cache indexes.

FIG. 5 is a schematic block diagram of a data storage system 500, in accordance with an exemplary embodiment of the present invention in which the cache 106 provides an API for managing the cache indexes as discussed above. Specifically, the cache 106 presents an API 508 through which the storage processor 102 obtains the cache index from the cache 106 and provides a cache index back to the cache 106 for cache reheat. Thus, the storage processor 102 may produce the cache index in block 212 of FIG. 2 by making a call to the cache 106 via the API 508, and the storage processor 102 provide a cache index to the cache 106 for reheat by similarly making a call to the cache 106 via the API 508.

Figure 6:
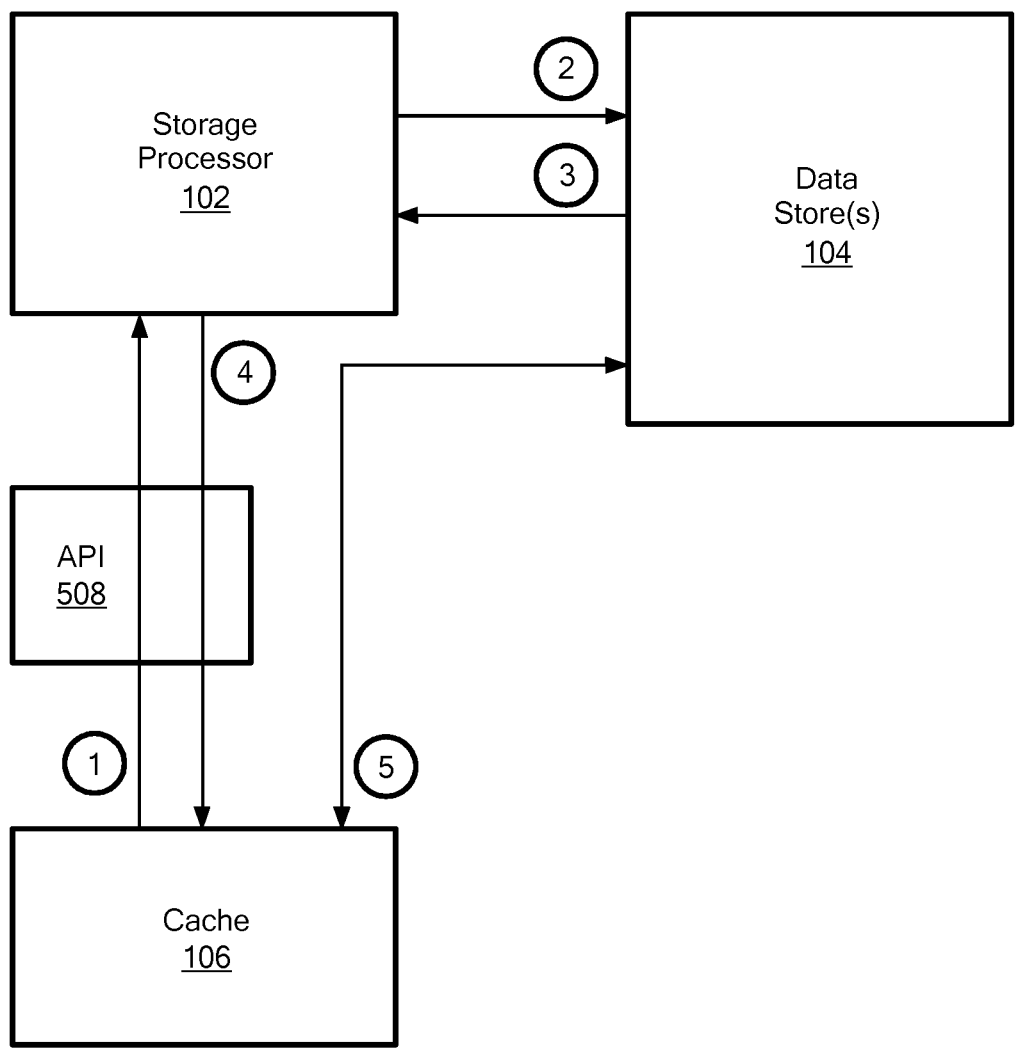
FIG. 6 is a schematic transaction flow diagram for fast cache reheat as discussed with reference to FIG. 5, in accordance with one exemplary embodiment.

FIG. 6 is a schematic transaction flow diagram for fast cache reheat as discussed with reference to FIG. 5, in accordance with one exemplary embodiment. In transaction (1), the cache 106 provides a cache index to the storage processor 102 via the API 508, and, in transaction (2), the storage processor 102 stores the cache index in the data store(s) 104. Transactions (1) and (2) can be repeated numerous times during normal operation of the data storage system. Upon a system restart, the storage processor 102 retrieves the cache index for the last snapshot from the data store(s) 104 in transaction (3) and provides the cache index to the cache 106 via the API 508. Transaction (5) represents the calls made by the cache 106 to the cache miss handler of the storage processor 102 based on the cache index, the retrieval of data by the storage processor 102 from the data store(s) in response to the calls from the cache 106, and the storage processor 102 providing the retrieved data to the cache 106 for fast cache reheat.

It should be noted that headings are used above for convenience and are not to be construed as limiting the present invention in any way.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that terms such as "data storage system," "file server," "NAS device," "disk drive," and "computer" may be used herein to describe devices that may be used in certain embodiments of the present invention and should not be construed to limit the present invention to any particular device type unless the context otherwise requires. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method for fast cache reheat in a data storage system, the method comprising:
   providing a volatile memory cache that includes content corresponding to a set of data blocks in a non-volatile second data store, wherein the non-volatile second data store is disk storage or solid state storage;
   periodically storing, in a non-volatile first data store, a snapshot of an index identifying storage locations of the set of data blocks, wherein such periodically storing of the snapshot is performed prior to a restart of the data storage system;
   upon a restart of the data storage system causing loss or corruption of the contents of the volatile memory cache, restoring the cache from data in the non-volatile second data store that is persistently stored and available for retrieval upon the restart of the data storage system by:
      retrieving from the first data store the index from the last snapshot stored prior to the restart, the last snapshot identifying content of the cache at a time of storing the last snapshot;

retrieving, from the non-volatile second data store, data from the storage locations identified in the index from the last snapshot; and storing the retrieved data in the cache, wherein the cache is separate from the first and second data stores.

2. A method according to claim 1, wherein the first data store and the second data store are the same data store.

3. A method according to claim 1, wherein the first data store and the second data store are different data stores.

4. A method according to claim 1, wherein at least one of the first data store or the second data store includes a set of block storage devices.

5. A method according to claim 1, wherein the index identifies physical storage locations.

6. A method according to claim 1, wherein the index identifies virtual storage addresses.

7. A method according to claim 6, wherein retrieving data from storage locations identified in the index comprises:
translating a virtual storage address to a physical storage address for the second data store.

8. A method according to claim 1, wherein the cache includes an application program interface, and wherein the cache provides the index via the application program interface.

9. A method according to claim 8, wherein retrieving data from storage locations identified in the index comprises:
providing the retrieved index to the cache via the application program interface; and
retrieving the data by the cache.

10. A method according to claim 9, wherein the data storage system includes a cache miss handler, and wherein retrieving the data by the cache includes making calls to the cache miss handler by the cache.

11. A data storage system comprising:
a storage processor configured to manage storage of data in at least one non-volatile data store; and
a volatile memory cache that includes content corresponding to a set of data blocks in a non-volatile second data store, wherein the non-volatile second data store is disk storage or solid state storage, wherein:
the storage processor is configured to periodically store, in a non-volatile first data store, a snapshot of an index identifying storage locations of the set of data blocks, wherein such periodically storing of the snapshot is performed prior to a restart of the data storage system, and, upon a restart of the data storage system causing loss or corruption of the contents of the volatile memory cache, retrieve the index from the last snapshot stored prior to the restart, the last snapshot identifying content of the cache at a time of storing the last snapshot; and
at least one of the storage processor and the cache is configured to retrieve, from the non-volatile second data store, data from the storage locations identified in the index from the last snapshot and store the retrieved data in the cache, data in the non-volatile second data store is persistently stored and available for retrieval upon the restart of the data storage system, wherein the cache is separate from the first and second data stores.

12. A system according to claim 11, wherein the first data store and the second data store are the same data store.

13. A system according to claim 11, wherein the first data store and the second data store are different data stores.

14. A system according to claim 11, wherein at least one of the first data store or the second data store includes a set of block storage devices.

15. A system according to claim 11, wherein the index identifies physical storage locations.

16. A system according to claim 11, wherein the index identifies virtual storage addresses.

17. A system according to claim 16, wherein retrieving data from storage locations identified in the index comprises:
translating a virtual storage address to a physical storage address for the second data store.

18. A system according to claim 11, wherein:
the cache includes an application program interface;
the cache provides the index to the storage processor via the application program interface; and
the storage processor stores the snapshot of the index in the second data store.

19. A system according to claim 18, wherein retrieving data from storage locations identified in the index comprises:
retrieving the index from the second data store by the storage processor;
providing the retrieved index by the storage processor to the cache via the application program interface; and
retrieving the data by the cache.

20. A system according to claim 19, wherein the storage processor includes a cache miss handler, and wherein retrieving the data by the cache includes making calls to the cache miss handler by the cache.

* * * * *